United States Patent [19]
Peterson

[11] 3,736,906
[45] June 5, 1973

[54] ANIMAL TAIL HOLDER

[76] Inventor: Wallace Peterson, Rt. 2, Boyceville, Wis. 54725

[22] Filed: Oct. 8, 1971

[21] Appl. No.: 187,683

[52] U.S. Cl. .................................................119/105
[51] Int. Cl. ...........................................A01k 13/00
[58] Field of Search .................119/105, 96; 54/22

[56] References Cited

UNITED STATES PATENTS

| | | | |
|---|---|---|---|
| 1,047,808 | 12/1912 | Hinkle et al. | 119/105 |
| 351,851 | 11/1886 | Cheney | 54/22 X |
| 2,762,334 | 9/1956 | Allen | 119/96 |
| 2,740,380 | 4/1956 | Johnson | 119/105 |
| 3,035,546 | 5/1962 | Peters | 119/105 |

Primary Examiner—Louis G. Mancene
Assistant Examiner—J. N. Eskovitz
Attorney—Thomas L. Johnson and Thomas M. Meshbesher

[57] ABSTRACT

Apparatus for retaining the tail of an animal (e.g. a cow) in an upright forward position so as to render the hind legs of the cow generally immovable. The apparatus includes a generally A-shaped frame having adjustable legs attached to an upper frame portion and which are positionable on the rump of a cow. A channel member suitable for receiving the tail of a cow therein is attached to the upper frame portion in a spaced, rearward relationship therewith. The A-shaped frame and the attached channel member are retained in a generally upright position by an adjustable length chain which is attached to the holder frame and secured to an immovable object (e.g. a stanchion).

6 Claims, 2 Drawing Figures

PATENTED JUN 5 1973

3,736,906

INVENTOR.
WALLACE PETERSON
BY
MERCHANT & GOULD
ATTORNEYS 3,736,906

ANIMAL TAIL HOLDER

BACKGROUND OF THE INVENTION

1. Field of the Invention

The present invention pertains to apparatus for retaining the tail of an animal in a generally upright position so as to substantially prevent any kicking action by the animal's hind legs.

It is known within the art that a partial paralysis of the hind legs of some particular animals (e.g. cattle) can be effected by maintaining the tail of the animal in an upright forward position. So paralysized, the animal is rendered unable to kick or move about on its hind legs. Apparatus which accomplishes such partial paralysis is highly useful in numerous different situations. For instance, this type of apparatus finds highly advantageous application in (1) the initial milking of heifers, (2) milking and treating cows with injured teats, (3) depositing semen during artificial breeding, and (4) in working with cattle which are in a generally nervous condition such as is frequently present during minor teat surgery, and the administration of injections in the animal.

2. Description of the Prior Art

Apparatus in the form of a tail sling is presently available for maintaining the tail of a cow in an upright forward position thereby causing partial paralysis of the cow's hind legs. See, U.S. Pat. No. 2,740,380. Although this tail sling represents a significant improvement over the various chain and shackle arrangements positionable about the ankles of a cow to prevent leg-kicking action, it has not been entirely satisfactory. For one reason, the apparatus requires the placement of various straps, harnesses and associated buckles on the cow prior to the positioning of the sling about the tail. During the placement of the straps, etc., the user is exposed to considerable danger as a result of the fact that the cow remains free to kick and generally move about. Finally, even when the tail sling is properly positioned, it is subject to dislocation (including total detachment) and, thus, allowing the cow to unexpectantly kick an adjacent party.

SUMMARY OF THE INVENTION

The present invention provides a tail holder which is positionable upon the rump of an animal so as to securely maintain the tail of the animal in an upright, forward position. The tail holder apparatus includes frame means having first and second leg portions positionable in an upright manner on the rump of an animal on opposite sides of the backbone thereof. Channel means suitable for receiving the tail of an animal therein are secured to the frame in a spaced, rearward relationship with the frame leg portions. The frame is preferably retained in its upright position on the rump of the animal by a chain-like element having a first end attached to the forward side of the frame and a second end suitable for attachment to a generally immovable object (e.g. the animal's stanchion). Preferably, this chain-like element has a readily variable length so as to allow adjustment thereof for properly retaining the channel means in its generally upright position. Further, the legs of the frame preferably have an adjustable length and one leg is pivotably attached to an upper frame portion so as to allow proper positioning of the frame on the rump of various size animals.

The apparatus described summarily above securely retains the tail of an animal, such as a cow, in an upright forward position. Of great importance is the fact that this is obtained without the necessity of positioning straps and buckles about the cow prior to the positioning of the tail holder. Instead, the tail holder is held in its upright position by an adjustable chain which does not contact the cow, but is attached to any adjacent immovable object (e.g. a cow stanchion). Furthermore, the adjustable frame legs allow the apparatus to be readily adjusted to properly fit different size cattle. Other advantages of my invention, such as its relatively simple construction, will become apparent from the detailed description which follows.

DETAILED DESCRIPTION OF THE PREFERRED EMBODIMENT

Figure 1:
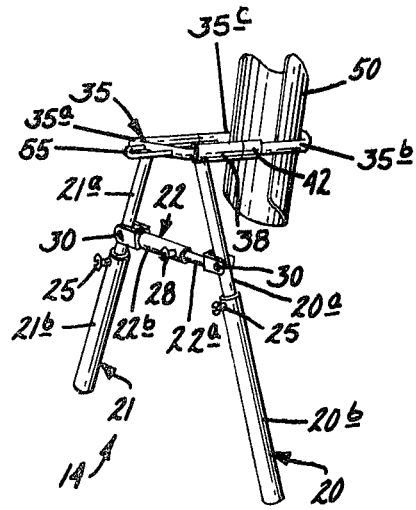
FIG. 1 is a perspective view of the tail holder provided by the present invention.

Turning now to the drawings, the present invention provides cattle restraining apparatus, generally designated 10 for holding the tail 11 of a cow 12 in an upright forward position. While finding a particular desirable application in the restraining of cattle, the present apparatus can be utilized on numerous other types of animals as well. As shown, cattle restraining apparatus 10 generally includes a tail holder 14 and a chain-like element 15 attached to the tail holder 14 for retaining it in the manner subsequently described.

More specifically, tail holder or retainer 14 includes first and second leg members 20 and 21, respectively, and a transverse bar member 22 extending between legs 20 and 21 so as to define a lower frame portion in the form of a generally A-shaped body. Each of the legs 20 and 21 include an upper leg portion 20a, 21a, and a lower leg portion 20b, 21b, respectively. Lower leg portions 20b and 21b are in the form of a hollow cylindrically-shaped tube having an inner dimension suitable for slideably receiving therein the respective upper leg portions 20a and 21a so as to allow adjustment of the overall length of legs 20 and 21. A set screw 25 in each of the lower leg portions 20b and 21b is engageable with the respective upper leg portions 20a and 21a for fixedly securing the lower leg portion to the respective upper leg portion after selection of the desired leg length.

Similar to legs 20 and 21, cross bar 22 includes a first bar portion 22a which is slideably receivable within a second bar portion 22b to allow adjustment of the overall length of cross bar 22. A set screw 28 in bar portion 22b engages bar portion 22a to secure the two portions after selection of the desired transverse length for bar 22. As shown, each of the outer ends of the bar portions 22a and 22b are pivotably hinged to legs 20 and 21, respectively. This pivoting action is provided by a pin 30 extending through each of the respective legs and which is journalled within the two fingers of the bifurcated outer end portion of each of the bar portions 22a and 22b.

The upper end of each of the legs 20 and 21 is attached to an upper frame portion 35. As shown, this upper frame portion 35 includes a bar member 35a extending transversely between the upper ends of legs 20 and 21 generally parallel to transverse bar 22 and two bar members 35b and 35c extending horizontally rearward from the upper ends of legs 20 and 21, respectively. Preferably, the bar members 35a, 35b and 35c are integrally formed, defining a generally U-shaped frame portion extending rearwardly in a plane essentially normal to the plane of the A-shaped frame portion defined by legs 20 and 21 and cross bar 22. The leg 20 is pivotably attached to the bar member 35b by pivotal attachment means in the form of a tubular sleeve member 38 rotatable about the bar member 35b. The upper end of leg 20 is attached to sleeve 38 by any suitable means (e.g. spot welding). A tubular member 42 is inserted onto bar member 35b and is rigidly fastened thereto so as to maintain the rotatable sleeve 38 in the position shown. Unlike rotatable leg 20, the leg 21 is rigidly attached (e.g. spot welded) to the bar member 35c.

A channel-like member 50 of suitable size for receiving the tail of a cow therein is attached to the rearwardmost end of the upper frame portion 35. As can be appreciated from FIG. 1, the rearward end portions of the bar members 35b and 35c are turned transversely inward toward each other so as to allow more secure attachment of channel-like member 50 to the frame (e.g. by spot-welding). The channel member 50 has a generally U-shaped transverse cross-section and is mounted so that the open face thereof is directed toward the forward portion of the tail holder 14. Although the channel member 50 is shown as a substantially straight member, it should also be understood that various alternative designs (e.g. a slightly arcuate configuration) can also be utilized.

The chain-like member 15 includes a first end connected to a U-shaped hook 55 having the two ends thereof attached to the forward side of the transverse bar member 35a. As shown, this first end of chain 15 is fixedly connected to hook 55, but means for allowing removeable connection can also be utilized. The second end of the chain-like member 15 extends through a pulley 58 which is attached to an adjacent, immovable object such as the stanchion 60 provided for cow 12. Preferably, the chain 15 includes a member, such as a hook 62 having a handle 63 attached thereto, connected to the end of the chain for allowing adjustment of the length of chain 15. As shown, hook 62 is detachably connectable to different ones of the links of chain 15 thereby allowing the length of chain 15 to be readily adjusted. However, other means, such as a rope and pulley arrangement, can also be utilized. As can be readily appreciated, the attachment of the chain 15 to stanchion 60 eliminates the necessity of positioning straps, harnesses, and associated buckles about the cow 12 prior to the positioning of tail holder 14.

Figure 2:
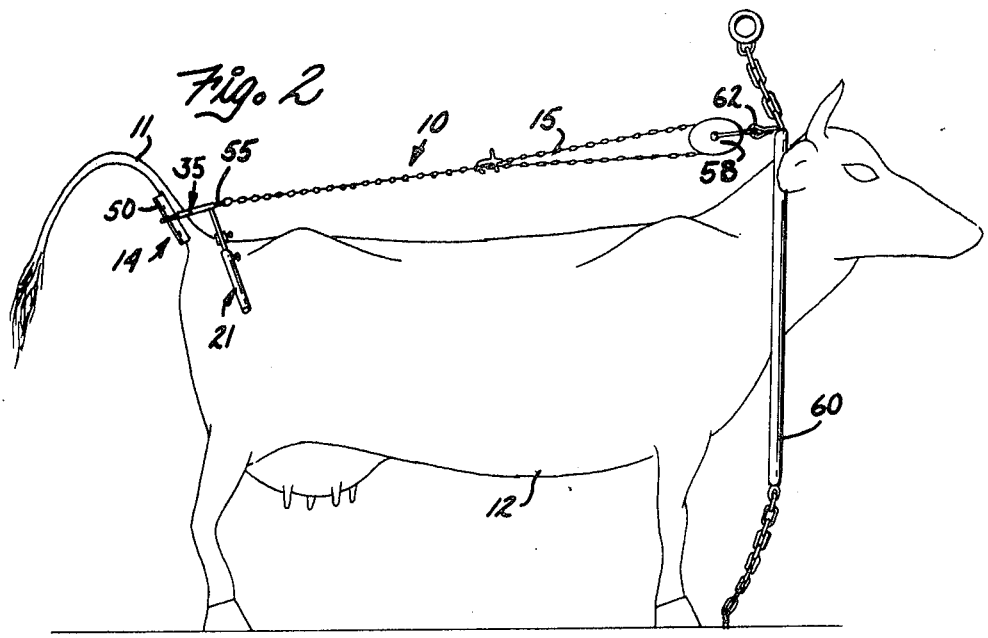
FIG. 2 is a side elevational view of the present invention shown retaining the tail of an animal in an upright forward position.

The cattle restraining apparatus 10 is utilized as follows. The tail holder 14 is slid over the tail 11 of cow 12 so that the tail extends between the channel 50 and bar members 35a, 35b and 35c. The legs 20 and 21 are then adjusted (i.e. for both vertical length and transverse position so that the lower ends of the legs are stably positioned on the rump of cow 12 on opposite sides of the backbone thereof. After this adjustment and the tightening of set screws 25 and 28, the unconnected end of chain 15 is pulled through pulley 58 toward the tail of cow 12 so as to position and retain the tail holder 14 in a generally upright position. In this position, the channel 50 engages tail 11 so as to position the tail in an upright, forward position (such as shown in FIG. 2) and the hook 62 is then connected to a link of chain 15 so as to provide a chain length which maintains this position of tail 11. So long as the tail holder 14 retains tail 11 in this upright, forward position, the hind legs of cow 12 are rendered generally immobile. Preferably, prior to the adjustment of the length of chain 15, cow 12 is moved forward as far as possible within stanchion 60 so as to further restrict its movement after the positioning of tail holder 14. The apparatus 10 is removed by simply reversing the above procedure.

Since my invention has been described solely in the context of a preferred embodiment thereof, it is my intent to be limited only by the spirit and scope of the appended claims.

What is claimed is:

1. Apparatus for restraining the movement of an animal by holding the tail of the animal in a generally upright forward position, comprising:
    a. frame means including a portion thereof engageable with the rump of the animal on opposite sides of the backbone thereof;
    b. a channel-like member secured to said frame means in a spaced rearward relationship therewith and suitable for receiving the tail of an animal therein when said frame means is positioned in a generally upright position on the rump of an animal; and
    c. a chain-like element having a first end connectable to said frame means, a second end engageable with a remotely positioned length-adjusting means for adjusting the position of said frame means by adjusting the length from said first end to said length-adjusting means, whereby said length-adjusting means is connected to said frame means only by said chain-like element, and
    d. means associated with said length-adjusting means for connecting said length-adjusting means to a generally immovable object adjacent to said length adjusting means.

2. The animal restraining apparatus of claim 1 wherein:
    a. said frame means includes an upper and lower frame portion, said upper frame portion extending rearwardly outward from adjacent the upper end of said lower frame portion and said lower frame portion having first and second leg members suitable for engaging the rump of an animal on opposite sides of the backbone thereof.

3. Apparatus for retaining the tail of an animal, comprising:
    a. frame means including upper and lower frame portion, said lower frame portion including first and second elongated leg members positionable on the rump of an animal on opposite sides of the backbone thereof, the upper end of one of said first and second leg members being pivotally connected to said upper frame portion and each of said first and second legs including a first portion slideably receivable within a second portion so as to allow adjustment of the overall length thereof, said lower frame portion further including a transverse bar extending between said first and second leg members and having the oppositely disposed ends thereof each pivotally connected to a different one of said first and second leg members, said transverse bar including a first portion slideably receivable within a second portion thereof to allow adjustment of the overall length of the transverse member;
b. a channel-like member attached to said frame means in a rearwardly spaced relationship therewith and suitable for receiving an animal tail therein;
c. means attached to said frame means suitable for connecting to means for retaining the frame means in a position on the rump of an animal so that said channel-like member retains the tail of the animal in a generally upright, forward position.

4. The animal tail retaining apparatus of claim 3 wherein:
a. said means attached to said frame means is an elongated element attached to said frame means at one end thereof,
b. said retaining means includes a length-adjusting means engageable with the opposite end of said elongated element for adjusting the length of said elongated element.

5. Apparatus for restraining the movement of an animal by holding the tail of the animal in a generally upright forward position, comprising:
a. frame means including an upper and lower frame portion, said lower frame portion having a generally A-shape defined by first and second leg members and a transverse member extending therebetween, said first and second leg members being suitable for engaging the rump of an animal on opposite sides of the backbone thereof, and said upper frame portion being attached to the upper ends of said first and second legs of said lower frame portion and extending rearwardly outward therefrom;
b. a channel-like member attached to said upper frame portion adjacent a rearward end thereof, said channel-like member being suitable for receiving the tail of an animal therein when said lower frame portion is positioned in a generally upright position on the rump of an animal; and
c. an elongated element having a first end connectable to said frame means and extendable in a forward direction therefrom, a second end connectable to a generally immoveable object, and having means associated therewith for adjusting the length thereof so as to retain said channel-like member in a generally upright position on the rump of the animal.

6. The animal restraining apparatus of claim 5 wherein:
a. said first and second leg members each include a first portion slideably receivable within a second portion so as to allow adjustment of the overall length thereof;
b. said upper frame portion includes attachment means for pivotally connecting the upper end of one of said first and second legs to said upper frame portion; and
c. said transverse member includes a first portion slideably receivable within a second portion for allowing adjustment of the overall length thereof and means associated with the outer ends of said member for pivotally connecting the ends thereof to the respective ones of said first and second legs.

* * * * *